United States Patent
Stéphane et al.

(10) Patent No.: US 6,516,702 B1
(45) Date of Patent: Feb. 11, 2003

(54) BRAKE BOOSTER

(75) Inventors: Gendrin Stéphane, Bruz (FR); Jean Fourcade, Champs sur Marne (FR); Cédric Leboisne, Paris (FR); Jean-Marc Piel, Drancy (FR)

(73) Assignee: Robert Bosch GmbH, Stuttgart (DE)

( * ) Notice: Subject to any disclaimer, the term of this patent is extended or adjusted under 35 U.S.C. 154(b) by 0 day.

(21) Appl. No.: 09/979,815

(22) PCT Filed: Sep. 5, 2001

(86) PCT No.: PCT/FR01/02746

§ 371 (c)(1),
(2), (4) Date: Nov. 16, 2001

(87) PCT Pub. No.: WO02/22418

PCT Pub. Date: Mar. 21, 2002

(30) Foreign Application Priority Data

Sep. 13, 2000 (FR) .............................................. 00 11753

(51) Int. Cl.⁷ ............................................... F15B 13/16
(52) U.S. Cl. ...................................... 91/367; 303/114.3
(58) Field of Search ........................ 303/114.3; 91/385, 91/367

(56) References Cited

U.S. PATENT DOCUMENTS

| | | | | |
|---|---|---|---|---|
| 5,226,347 A | * | 7/1993 | Gautier et al. | 91/369.2 |
| 5,410,880 A | * | 5/1995 | Schluter | 60/547.1 |
| 5,526,729 A | * | 6/1996 | Ando et al. | 91/32 |
| 5,725,291 A | * | 3/1998 | Michels | 303/125 |
| 5,890,775 A | * | 4/1999 | Tsubouchi et al. | 303/114.3 |
| 6,062,656 A | * | 5/2000 | Unterforsthuber et al. | 303/122.09 |
| 6,253,656 B1 | * | 7/2001 | Gilles | 91/367 |
| 6,314,865 B1 | * | 11/2001 | Henein et al. | 92/169.3 |

* cited by examiner

Primary Examiner—Jack Lavinder
Assistant Examiner—Benjamin A Pezzlo
(74) Attorney, Agent, or Firm—Leo H McCormick, Jr.; Warren Comstock

(57) ABSTRACT

A servobrake having a rigid jacket defined by a first shell joined to a second shell by through tie-bars to create variable volume front and rear chambers. The front chamber is permanently connected to a first pressure source whereas the rear chamber is selectively connected to the first pressure source and a second pressure source. The servobrake including a pressure sensor for the measurement of the pressure inside of the front and rear chambers. The pressure sensor is characterized by being attached to a front end of the through-tie bar whereas the tie-bar is characterized by a hollowed-out body with a hollow inner needle sealingly retained therein. The hollow inner needle defines a first chamber while a second chamber is defined by a space between the inner hollow needle and the hollowed-out body. The hollowed-out body has first ports therein for connecting the rear chamber with the first chamber through which pressure present in the rear chamber is transmitted to the pressure sensor. The hollowed-out body has second ports therein for connecting the front chamber with the second chamber through which pressure present in the front chamber is transmitted to the pressure chamber.

1 Claim, 2 Drawing Sheets

BRAKE BOOSTER

This invention relates to a vacuum-assisted braking booster, or a servobrake, comprising a pressure-measuring device.

BACKGROUND OF THE INVENTION

A booster of a well-known type comprises a rigid jacket, made up of two shells forming, on the one hand, the cover and, on the other hand, the cylinder, which are assembled by crimping and on which the cover screws for the attachment to the dashboard cross-panel of the vehicle (rear part of the servobrake) and the cylinder screws for the fastening of the master cylinder (front part of the servobrake) are fixed respectively. Inside the jacket of the servobrake, a variable-volume front chamber is separated from a variable-volume rear chamber by a tight flexible diaphragm and by a rigid skirt driving a pneumatic piston which bears, through a push rod, on the primary piston of a tandem master cylinder of a hydraulic braking system. The front chamber, directed towards the tandem master cylinder, is hydraulically connected to a vacuum source whereas the rear chamber is hydraulically connected, using a valve control, to a propellant fluid source, typically atmospheric-pressure air.

At rest, that is when the driver does not depress the brake pedal, the front and rear chambers are interconnected, while the rear chamber is isolated from the atmospheric pressure. On braking, first the front chamber is isolated from the rear chamber and then air is admitted into the rear chamber.

In this type of servobrakes, it is most important to be able to measure the pressure in at least the rear chamber, by means of a sensor module, fastened on the front ace of the servobrake. Generally, the pressure transmission for the measurement is carried out using a helical tube, located inside the jacket.

SUMMARY OF THE INVENTION

With a view of, on the one hand, improving the rigidity and, on the other hand, reducing the weight of the servobrake, by means of a thinner jacket, through tie bars are generally used. Yet the assembling process is such that the use of a helical tube is incompatible with that of through-tie bars.

So as to cope with said disadvantages, it is the object of the present invention to provide a servobrake as per the preamble, which allows both the use of tie bars and a measurement of the pressure at least inside the rear chamber by means of a sensor situated on the front face and, moreover, an easy assembling of said servobrake.

To this end, the main subject of this invention is a servobrake, comprising a rigid jacket, made up of two shells, namely the cover and the cylinder, which are assembled by means of through-tie bars, and comprising variable-volume front and rear chambers, the front chamber being operatively permanently connected to a first pressure source whereas the rear chamber is connected to a second pressure source, said servobrake comprising a pressure sensor for the measurement of at least the pressure inside the rear chamber, characterized in that said pressure sensor is fastened to the front end of a through-tie bar, said tie bar having a hollowed-out body defining at least one chamber for the pressure transmission from the rear chamber towards the pressure sensor, said tie bar comprising ports connecting said rear pressure chamber with the transmission chamber.

Thus, in an advantageous manner, the through-tie bars having a hollowed-out body have substantially the same outer dimensions as the conventional solid through-tie bars, so that they can replace such conventional tie bars, when the servobrake is assembled and that, besides, they contribute to the simplifying of the construction of said servobrake in that they constitute a means for the pressure transmission from the rear chamber towards the pressure sensor, located at the front part of said servobrake, this being achieved with as few elements as possible.

According to a preferred embodiment of the invention, the hollowed-out through-tie bar further comprises a hollow inner needle, set in a leakproof manner in said body, in which case the through-tie bar includes, on the one hand, a chamber for the pressure transmission from the rear chamber towards the sensor, such chamber being formed by the hollow needle and, on the other hand, a chamber for the pressure transmission from the front chamber towards the sensor, such chamber being defined between the tie bar and the needle, and the tie bar comprises ports connecting said front pressure chamber with the transmission chamber, defined about the needle, as well as ports connecting the rear pressure chamber with the transmission chamber, formed in the needle.

Other features and advantages of the present invention will be apparent from the following detailed description of preferred embodiments, by way of example and by no means as a limitation, when taken in conjunction with the accompanying drawings

DETAILED DESCRIPTION OF THE INVENTION

Figure 1:
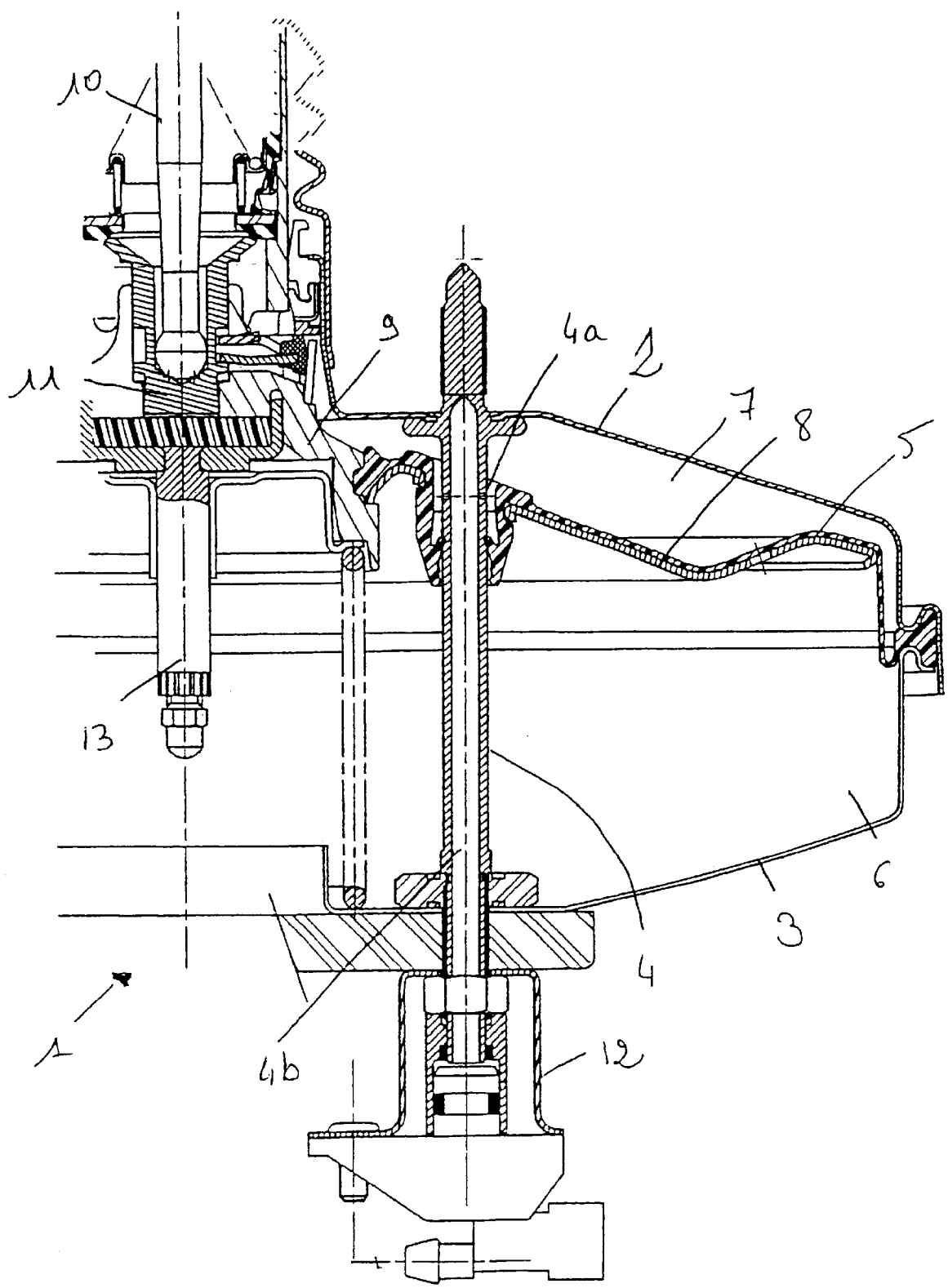
FIG. 1 is a longitudinal sectional view of a servobrake according to a first embodiment of this invention.

A servobrake according to the present invention comprises a rigid jacket 1, made up of two shells forming, on the one hand, the cover 2 and, on the other hand, the cylinder 3, which are assembled by means of through-tie bars 4.

Inside the jacket 1 of the servobrake, a variable-volume front chamber 6 is separated from a variable-volume rear chamber 7 by a tight flexible diaphragm 5 resting on a skirt 8, the front chamber 6 being operatively permanently connected to a first pressure source, delivering a first pressure (vacuum source) The skirt 8 drives a piston body 9 at the time of the volume variations of the chambers 6, 7. The piston body 9 comprises passages, connecting the front chamber 6 to the rear chamber 7.

A control rod 10 moves inside the piston body 9, between a rest position and an end actuation position, as a function of a resultant of forces, which is exerted on it and which comprises an input force, applied in the axial actuation direction, whereas a distributor plunger 11 is driven by the control rod 10.

This distributor plunger 11 controls a valve fitted with a first flap which shuts off a passage connecting the front chamber 6 with the rear chamber 7, and a second flap which opens, on actuation, the air-supply passage of the rear chamber of the servobrake. The pneumatic piston 9 drives a push rod 13, bearing on the primary piston of a tandem master cylinder, not shown.

All these features are well known and, therefore, they do not require a more circumstantial description. The through-tie bar 4 is a hollowed-out body provided with ports 4a, in its part located at the rear chamber 7, so as to connect said rear chamber 7 with the inside of the tie bar 4.

At the front end of the tie bar 4, a pressure sensor protruding from the jacket 1, is mounted by means of a fastening hood 12.

The hollowed-out body of the tie bar 4 forms a chamber 4b for the pressure transmission from the rear chamber 7 towards the pressure sensor.

Figure 2:
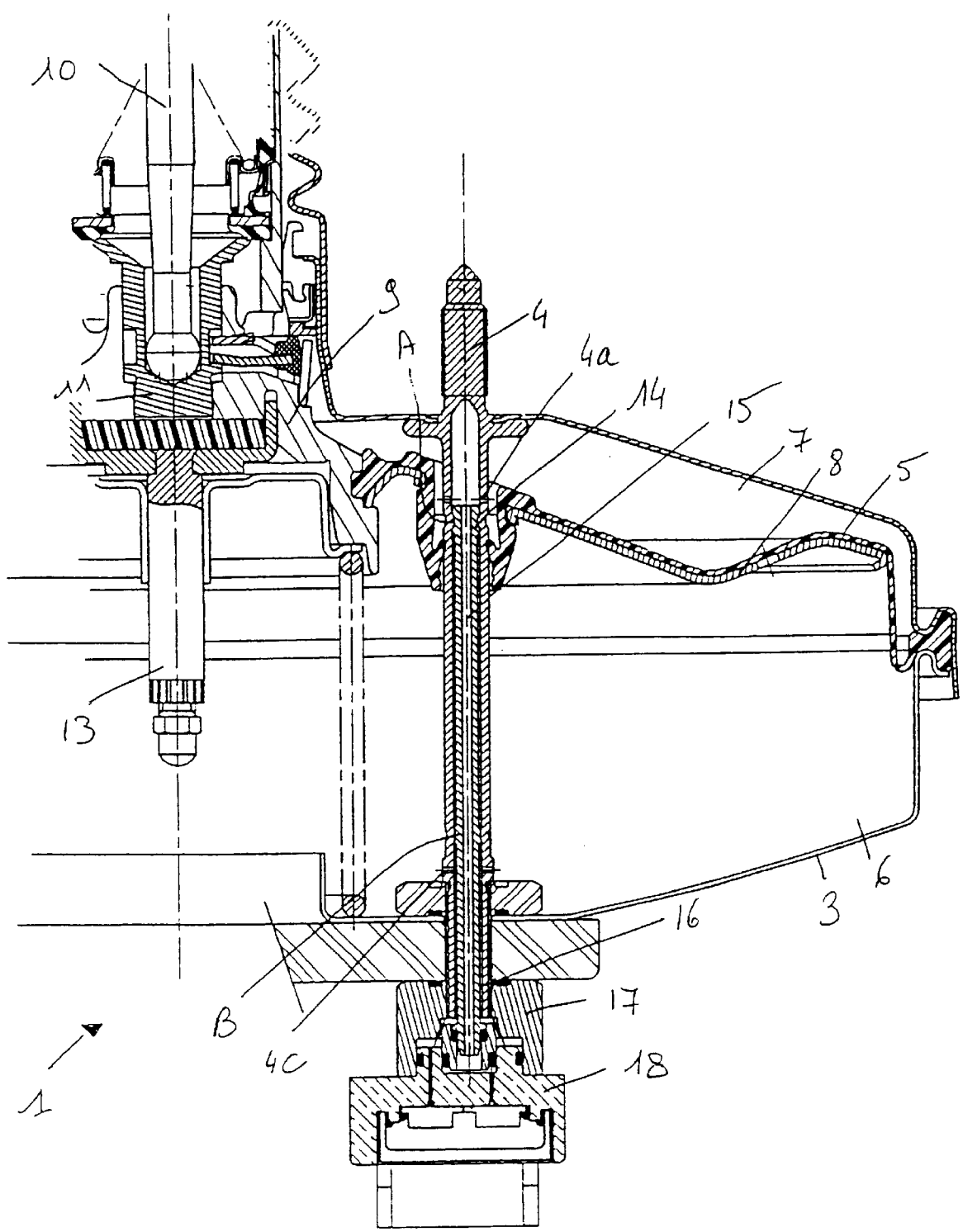
FIG. 2 is a longitudinal sectional view of a servobrake according to a second embodiment of this invention.

FIG. 2 shows a second embodiment, in which the same reference numerals will designate the same elements as in FIG. 1.

A hollow needle 14 is placed inside the tie bar 4 and it is set, in a leakproof manner, in the tie bar 4 at points A and B. The hollow needle 14 defines a transmission chamber 15 between the rear chamber 7 and the pressure sensor 18, whereas a transmission chamber 16 is formed between the hollow needle 14 and the inner wall of the tie bar 4, for the pressure transmission from the front chamber 6 towards the sensor 18, through ports 4c made in the tie bar 4 at its part extending within the front chamber 6 beyond the tightness point In this embodiment, the sensor 18 is attached through an adapter 17.

We claim:

1. A servobrake having a rigid jacket defined by a first shell joined to a second shell by through tie-bars to create variable volume front and rear chambers, said front chamber being permanently connected to a first pressure source whereas said rear chamber is selectively connected to said first pressure source and a second pressure source, said servobrake including a pressure sensor for the measurement of the pressure inside of said front and rear chambers, said pressure sensor being characterised by being attached to a front end of said through-tie bar and said tie-bar being characterised by a hollowed-out body with a hollow inner needle sealingly retained therein, said hollow inner needle defining a first chamber while a second chamber is defined by a space between said inner hollow needle and said hollowed-out body, said hollowed-out body having first ports therein for connecting said rear chamber with said first chamber through which pressure present in said rear chamber is transmitted to said pressure sensor; said hollowed-out body having second ports for connecting said front chamber to said second chamber through which pressure in said front chamber is transmitted to said pressure sensor.

* * * * *